(12) United States Patent
Fraser

(10) Patent No.: US 9,358,874 B2
(45) Date of Patent: Jun. 7, 2016

(54) ELECTRIC MOTOR OR GENERATOR SYSTEM

(71) Applicant: Alexander George Fraser, Hants (GB)

(72) Inventor: Alexander George Fraser, Hants (GB)

(73) Assignee: PROTEAN ELECTRIC LIMITED (GB)

( * ) Notice: Subject to any disclaimer, the term of this patent is extended or adjusted under 35 U.S.C. 154(b) by 0 days.

(21) Appl. No.: 14/399,933

(22) PCT Filed: Apr. 15, 2013

(86) PCT No.: PCT/IB2013/052987
§ 371 (c)(1),
(2) Date: Nov. 7, 2014

(87) PCT Pub. No.: WO2013/168029
PCT Pub. Date: Nov. 14, 2013

(65) Prior Publication Data
US 2015/0144410 A1 May 28, 2015

(30) Foreign Application Priority Data
May 9, 2012 (GB) .................................. 1208101.4

(51) Int. Cl.
| | |
|---|---|
| *B60K 7/00* | (2006.01) |
| *B60L 15/20* | (2006.01) |
| *H02K 7/00* | (2006.01) |

(52) U.S. Cl.
CPC .............. *B60K 7/0007* (2013.01); *B60L 15/20* (2013.01); *H02K 7/006* (2013.01);
(Continued)

(58) Field of Classification Search
CPC ..................... B60K 7/0007; B60K 2007/0038; B60K 2007/0092; B60L 15/20; B60L 2220/50; B60L 2220/44; B60L 2240/423; B60G 2200/144; B60G 3/20; H02K 7/006
See application file for complete search history.

(56) References Cited

U.S. PATENT DOCUMENTS

| | | | | |
|---|---|---|---|---|
| 6,113,119 A | * | 9/2000 | Laurent ..................... | B60G 3/01 180/65.51 |
| 7,287,611 B2 | * | 10/2007 | Nagaya ..................... | B60G 3/01 180/65.51 |

(Continued)

FOREIGN PATENT DOCUMENTS

| | | |
|---|---|---|
| DE | 19948224 C1 | 6/2001 |
| JP | 2005333705 A | 2/2005 |

OTHER PUBLICATIONS

European Patent Office, PCT International Search Report, Aug. 29, 2013, WIPO.

(Continued)

*Primary Examiner* — Brodie Follman
*Assistant Examiner* — Brian Cassidy
(74) *Attorney, Agent, or Firm* — The Mason Group Patent Specialists LLC; Valerie M. Davis

(57) ABSTRACT

An electric motor or generator system comprising a stator, a rotor, a first bearing, a first coupling device and a second coupling device, wherein the second coupling device includes a first coupling element arranged to be coupled to a vehicle and a second coupling element coupled to the rotor with a second bearing mounted between the first coupling element and the second coupling element to allow the rotor to rotate relative to the vehicle, wherein the first bearing is mounted between a surface of the stator and a surface of the rotor or the second coupling element to allow the rotor to rotate relative to the stator and the first coupling device is arranged to substantially preventing movement of the stator relative to the first coupling element in a first degree of freedom while allowing movement of the stator relative to the first coupling element in at least a second degree of freedom.

11 Claims, 3 Drawing Sheets

SECTION A-A

(52) U.S. Cl.
CPC .............. *B60K 2007/0038* (2013.01); *B60K 2007/0092* (2013.01); *B60L 2220/44* (2013.01); *B60L 2220/50* (2013.01); *B60L 2240/423* (2013.01); *Y02T 10/641* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 7,422,080 | B2* | 9/2008 | Suzuki | B60K 17/02 180/65.1 |
| 8,476,794 | B2* | 7/2013 | Amutham | H02K 7/088 310/216.021 |
| 8,833,694 | B2* | 9/2014 | Gilleran et al. | 244/50 |
| 2004/0080223 | A1* | 4/2004 | Shimizu | 310/75 C |
| 2004/0099455 | A1* | 5/2004 | Nagaya | 180/65.5 |
| 2004/0112657 | A1* | 6/2004 | Ajiro et al. | 180/65.5 |
| 2005/0056471 | A1* | 3/2005 | Kurata | B60G 3/01 180/65.51 |
| 2005/0247496 | A1* | 11/2005 | Nagaya | 180/65.5 |
| 2006/0048978 | A1* | 3/2006 | Nagaya | B60G 3/01 180/6.48 |
| 2006/0087182 | A1* | 4/2006 | Sugiyama | B60K 7/0007 310/75 C |
| 2006/0144626 | A1* | 7/2006 | Mizutani | B60K 7/0007 180/65.51 |
| 2006/0158050 | A1* | 7/2006 | Maeda | B60K 6/26 310/58 |
| 2006/0272871 | A1* | 12/2006 | Murata | B60G 3/20 180/65.51 |
| 2007/0068715 | A1* | 3/2007 | Mizutani | B60G 3/20 180/65.51 |
| 2007/0163824 | A1* | 7/2007 | Suzuki | B60K 7/0007 180/65.51 |
| 2007/0199748 | A1* | 8/2007 | Ross | B60G 3/20 180/65.51 |
| 2008/0017462 | A1* | 1/2008 | Mizutani | B60G 3/20 188/266.1 |
| 2008/0061525 | A1* | 3/2008 | Ward | B60K 7/0007 280/93.508 |
| 2008/0066976 | A1* | 3/2008 | Yamada | B60K 17/356 180/55 |
| 2008/0093133 | A1* | 4/2008 | Yogo | B60G 3/20 180/55 |
| 2008/0223637 | A1* | 9/2008 | Bartilson | B60G 3/20 180/65.265 |
| 2008/0283314 | A1* | 11/2008 | Suzuki | B60G 7/008 180/65.51 |
| 2008/0283315 | A1* | 11/2008 | Suzuki | B60G 3/01 180/65.51 |
| 2009/0133944 | A1* | 5/2009 | Nishioka | B60G 3/20 180/65.51 |
| 2009/0166111 | A1* | 7/2009 | Mizutani et al. | 180/65.51 |
| 2009/0236158 | A1* | 9/2009 | Sakuma | B60K 7/0007 180/65.51 |
| 2009/0273249 | A1* | 11/2009 | Lamperth | B60K 7/0007 310/77 |
| 2010/0000811 | A1* | 1/2010 | Iwano | B60G 7/008 180/65.51 |
| 2010/0116572 | A1* | 5/2010 | Schmitt | B60G 3/28 180/65.51 |
| 2010/0230192 | A1* | 9/2010 | Riley | B60K 6/48 180/65.25 |
| 2011/0139523 | A1* | 6/2011 | Chen | B60K 7/0007 180/65.51 |
| 2011/0209938 | A1* | 9/2011 | Basadzishvili | B60G 3/01 180/305 |
| 2012/0298432 | A1* | 11/2012 | Lee | B60K 7/0007 180/55 |
| 2013/0241366 | A1* | 9/2013 | Kim | H02K 3/28 310/67 R |
| 2014/0353054 | A1* | 12/2014 | Matayoshi | B60G 3/20 180/55 |
| 2015/0137669 | A1* | 5/2015 | Lampic | B60K 7/0007 310/67 R |
| 2015/0151778 | A1* | 6/2015 | Kageyama | B60G 3/20 701/41 |

OTHER PUBLICATIONS

GB Intellectual Property Office, First Search Report, Jun. 15, 2012.
European Patent Office; International Search Report; Nov. 14, 2013; World Intellectual Property Organization; Munich.
European Patent Office; Written Opinion of the International Search Authority; Sep. 2, 2014; World Intellectual Property Organization; Munich.
Intellectual Property Office; Search Report; Jun. 18, 2012; Intellectual Property Office; South Wales.

\* cited by examiner

SECTION A-A

ELECTRIC MOTOR OR GENERATOR SYSTEM

The present invention relates to an electric motor or generator and in particular an electric motor or generator for mounting to a vehicle.

With increased interest being placed in environmentally friendly vehicles there has been a corresponding increase in interest in the use of electric vehicles.

Although most commercially available electric vehicles utilise a central electric motor that is used to drive two or more of the vehicles wheels, an alternative solution that is gaining increased popularity utilises in-wheel electric motors, where individual electric motors are used to drive the respective wheels of a vehicle.

An in-wheel electric motor will typically have a stator mounted to the main body of the vehicle while a rotor of the in-wheel electric being directly, or indirectly, mounted to a wheel.

However, during operation of a vehicle having an in-wheel electric motor drive configuration, external forces on a wheel coupled to the electric motor rotor can result in the rotor being displaced relative to the stator through either rotor or wheel bearing deflection.

Accordingly, in order to maintain sufficient torque production in a variety of different driving conditions, in-wheel electric motor components are made sufficiently stiff to ensure that an optimum stator/rotor geometry is maintained. However, this can result in extra mass, space and packaging requirements.

It is desirable to improve this situation.

In accordance with an aspect of the present invention there is provided an electric motor or generator system according to the accompanying claims.

Using a coupling device between a portion of a vehicle that does not rotate relative to a drive wheel, for example an element of the vehicle's suspension such as an upright element, and an electric motor stator allows a load path between the vehicle and the stator to be created that restricts a degree of freedom while not substantively restrict other degrees of freedom.

This has the advantage of allowing the stator and rotor of an electric motor to move as a closely coupled system, where a deflection on the rotor results in a corresponding deflection of the stator, while still allowing the rotor to rotate relative to the stator. This allows the stator/rotor air gap, and consequently the generated torque, to be maintained when the electric motor is being used to drive a vehicle.

The present invention will now be described, by way of example, with reference to the accompanying drawings, in which.

The embodiments of the invention described are for an electric motor for use in a wheel of a vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. In addition, some of the aspects of the invention are applicable to an arrangement having the rotor centrally mounted within radially surrounding coils.

Figure 1:
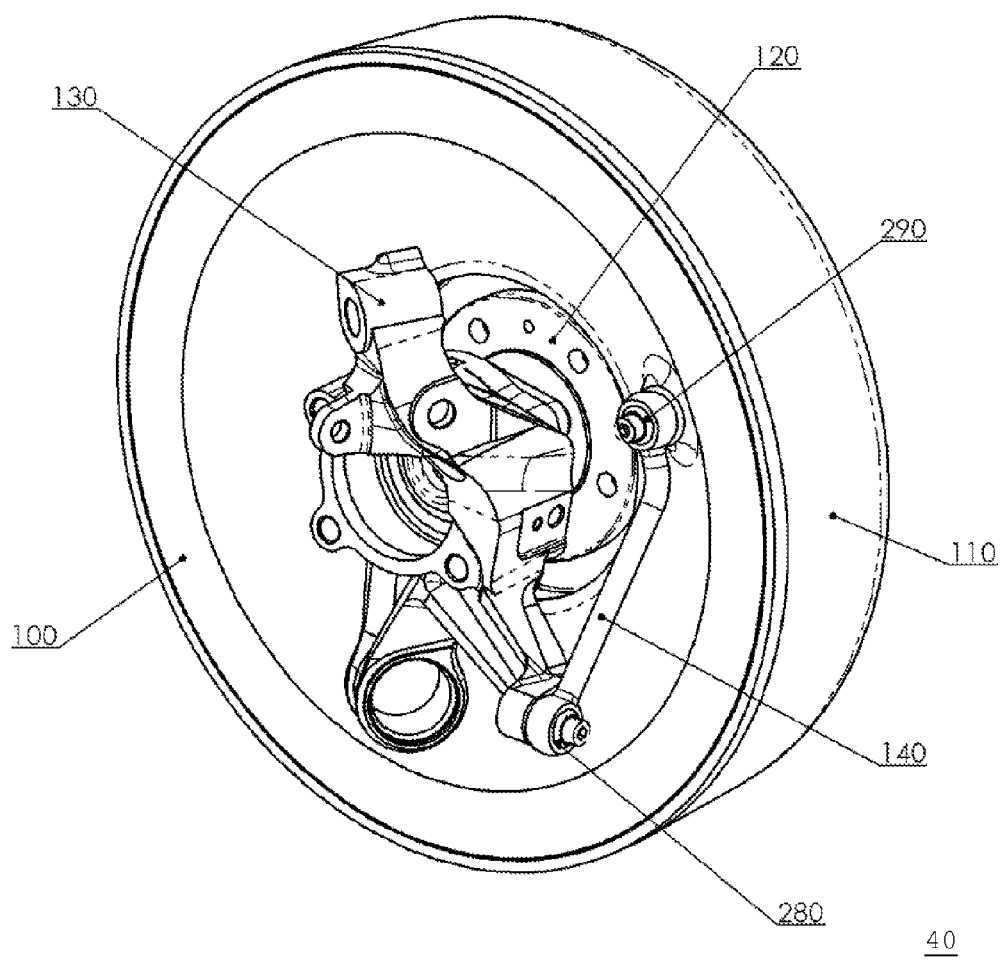
FIG. 1 illustrates an isometric view of an electric motor assembly according to a first embodiment of the present invention.
Figure 2:
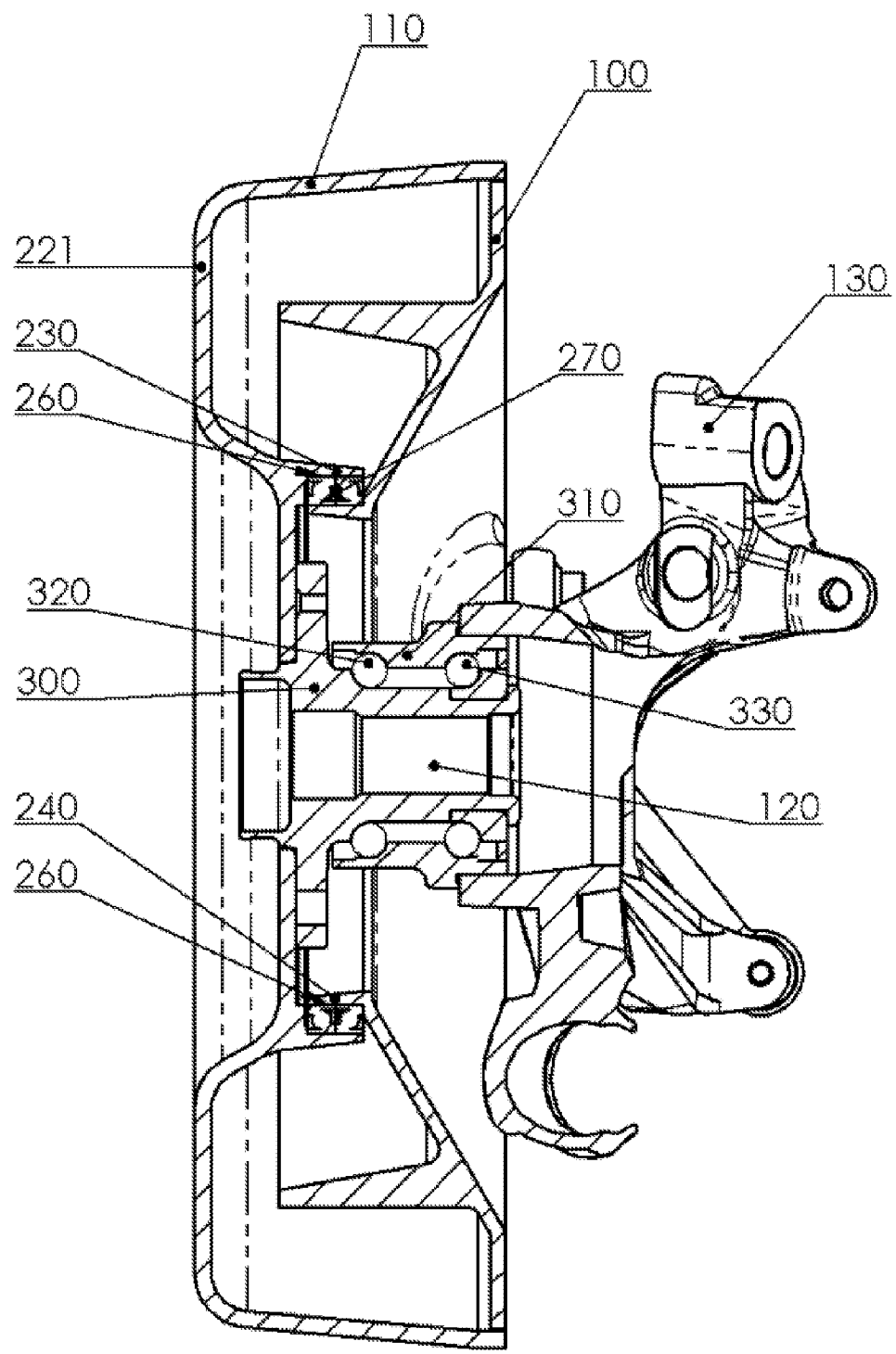
FIG. 2 illustrates an axial cross section of an electric motor assembly according to an embodiment of the present invention.

The physical arrangement of a first embodiment is best understood with respect to FIGS. 1 and 2. The assembly can be described as a motor and bearing, it can also be described as a hub motor or hub drive as it is built to accommodate a wheel.

FIGS. 1 and 2 illustrate an electric motor assembly according to a first embodiment of the present invention, where FIG. 1 illustrates an isometric view of the electric motor and FIG. 2 illustrates a cross section view.

The motor assembly 40 includes a stator 100, a rotor 110, a bearing block 120, an upright element 130 that is arranged to be mounted to a vehicle, for example via a spring damping device and a suspension control arm as is well known to a person skilled in the art, and a coupling device 140 that is mounted between the stator 100 and the upright element 130.

Although not illustrated, the stator 100 will typically include multiple coils formed on stator tooth laminations and electronics to drive current through the coils.

The rotor 100 includes a front radial wall and a cylindrical portion 221.

Formed on the inner surface of the rotor's front radial wall is an annular ring 230 that extends in an axial direction from the inner surface of the rotors front radial wall 221 toward the stator 100. As described in detail below, the annular ring 230 formed on the front wall of the rotor 110 forms part of a housing for a bearing.

The rotor 110 includes a plurality of magnets (not shown) arranged around the inside of the cylindrical portion 221. The plurality of magnets are preferably mounted on a rotor back iron. The magnets are in close proximity to the coils mounted on the stator tooth laminations so that magnetic fields generated by the coils generate a force on the magnets arranged around the inside of the cylindrical portion 221 of the rotor thereby causing a torque to be applied to the rotor 110.

The rotor 110 is attached to a vehicle via the bearing block 120. The bearing block 120 can be a standard bearing block as would be used in a vehicle to which the motor assembly 40 is to be fitted. The bearing block 120 comprises two parts, a first coupling element 310 that is arranged to be coupled to the upright element 130 and a second coupling element 300 that is arranged to be coupled to the rotor 110. Although the present embodiment describes the bearing block 120 as being coupled to the upright element 130, as would be appreciated by a person skilled in the art, the bearing block 120 can be mounted to other vehicle components. Alternatively, other bearing arrangements may be used.

Mounted between the bearing block's first coupling element 310 and second coupling element 300 are two bearings 320, 330, for example angular contact ball bearings. Preferably the two angular contact ball bearings 320, 330 are arranged as matching front to front angular contact ball bearings.

Angular contact ball bearings can sustain significant axial loads in one direction together with radial loads. As a result of their design, when a radial load is applied an axial force component is produced. Accordingly, in circumstances when radial loads and axial loads in both directions are likely to be sustained, for example when used on a vehicle as a hub motor, it is desirable to use two angular contact ball bearings, for example matched angular contact ball bearings.

The first coupling element 310 and the second coupling element 300 act as the outer and inner rings, respectively, of the two angular contact ball bearings 320, 330. The balls (not shown) of the angular contact ball bearings are mounted within cages (not shown) placed between the ball bearings inner and outer rings. However, the first coupling element 310 and the second coupling element can act as the outer and inner rings respectively.

Although the bearing block 120 is described using matched angular contact ball bearings, other types of ball bearings can be used.

Although the present embodiment illustrates the use of two sets of ball bearings a single or multiple sets of ball bearings can be used.

The rotor 110 can thus be fixed to a vehicle with which it is to be used via the bearing block 120 at the central portion on the inner radial wall of the rotor to allow the rotor to rotate relative to the vehicle. This has an advantage in that a wheel rim and tyre can then be fixed to the rotor at the central portion using the normal wheel bolts to fix the wheel rim to the central portion of the rotor 110 and consequently firmly onto the rotatable side of the bearing block 120. The wheel bolts may be fitted through the central portion of the rotor 110 through into the bearing block 120 itself. An advantage of this arrangement is that the motor assembly 40 may be retrofitted to an existing vehicle by removing the wheel, bearing block 120 and any other components such as the braking arrangement. The existing bearing block 120 can then be fitted inside the assembly and the whole arrangement fitted to the vehicle with the normal rim and wheel fitted to the rotor 110 so that the rim and wheel surrounds the whole motor assembly. Accordingly, retrofitting an in-wheel electric motor to existing vehicles becomes a routine process.

A further advantage is that there are no forces for supporting the vehicle on the outside of the rotor 110, particularly on the circumferential wall 221 carrying the magnets on the inside circumference. This is because the forces for carrying the vehicle are transmitted directly from the suspension fixed to one side of the bearing block 120 to the central portion of the wheel surrounding the rotor 110 fixed to the other side of the bearing block 120 (via the central portion of the rotor wall).

Formed on the inner surface of a radial portion of the stator is an annular ring 240 that extends in an axial direction from the inner surface of the stator's radial wall towards the inner surface of the front radial wall 221 of the rotor 110. The stator's annular ring 240 is arranged to have a smaller radius than the annular ring 230 formed on the front radial wall 221 of the rotor 110 with it axial length running parallel to that of the annular ring 230 formed on the rotor 110.

The radius of the stator's annular ring 240 is chosen so that a radial gap exists between the inner surface 250 of the rotor's annular ring and an outer surface 260 of the stator's annular ring 240, thereby forming a housing between the stator's annular ring 240 and the rotor's annular ring 230 when the rotor 110 and the stator 100 are mounted together.

Placed between the inner surface 250 of the rotor's annular ring 230 and the outer surface 260 of the stator's annular ring 240 is a third bearing 270. For the purposes of the present embodiment the third bearing 270 includes two angular contact bearings having an inner and outer ring. Preferably, to minimize the ingress of dirt into the electric motor, the ball bearing 270 is a sealed type ball bearing. However, other types of bearing can be used, for example a conventional radial bearing with an added seal on a side of the bearing that faces outwardly from the rear portion 230.

The diameter of the inner surface of the third bearings inner ring will typically be slightly larger than the diameter of the outer surface of the stator's annular ring 240 so that the third bearing 270 can be mounted onto the stator's annular ring 240.

The inner surface of the third bearing 270 is mounted to the stator's annular ring 240 using a press fit.

Preferably, to avoid the ingress of dirt between the gap formed between the outer surface of the third ball bearings outer ring and the inner surface 250 of the rotor's annular ring 230, an elastic element (not shown) is placed in this gap, for example one or more O rings and/or plastic rings that are embedded within the outer ring of the third bearing 270.

To minimize wear on the third bearing 270, and any seals incorporated within the third bearing 270, preferably the radius of the rotor's annular ring and the stator's annular ring 240 are selected so that the radius of the third bearing 270 is kept to a minimum.

Preferably, the radius of the outer surface of the third ball bearings 270 outer ring is less than half the radius of the rotor 110.

The mounting of the third bearing 270 between the stator's annular ring 240 and the rotor's annular ring 230 allows the stator 100 to rotate relative to the rotor 110 around the same axis as the rotor rotates relative to the vehicle.

Although the present embodiment illustrates the use of the positioning of the third bearing 270 between the stator's annular ring 240 and the rotor's annular ring 230, other surfaces associated with the stator 100 and the rotor can be used. For example, the third bearing can be located between the stator's annular ring and a surface on the second coupling element 300.

The coupling device 140 coupled between the stator 100 and the upright element 130 is arranged to prevent any substantive rotation of the stator 100 relative to the upright element 130 and other non rotating elements of the vehicle while allowing the stator 100 to move in other degrees of freedom, thereby allowing the stator 100 to follow the movement of the rotor 110 if the rotor 110 is deflected at angles perpendicular to the axis of rotation of the rotor 110. This allows the stator 100 and the rotor 110 to move as a closely coupled system in degrees of freedom other than the axis of rotation, thereby allowing the air gap between the permanent magnets mounted on the rotor 110 and the stator coil windings to be maintained if the rotor 110 is deflected due to an external load. As such, the coupling device 140 acts as a torque reaction link between the stator 100 and the vehicle that substantively prevents rotation of the stator 100 relative to the vehicle while allowing movement in other degrees of freedom.

For the purposes of the present embodiment the coupling device 140 is a tie rod, with one end of the tie rod 140 being coupled to the suspension upright element 130 via a spherical bearing 280, such as a "rod end" bearing. This restrains the tie rod 140 translationally with respect to the upright element 130, while allowing the tie rod 140 to rotate in all three rotational degrees of freedom around this point. The tie rod 140 is likewise coupled to the stator 100 with a rod end bearing 290. This results in the tie rod 140 and associated rod end bearings in restraining the rotational degree of freedom of the stator 100 around the motor's rotation axis. The tie rod 140 has therefore completed the load path with which the stator 100 can react the motor torque back to the body of the vehicle, while allowing the stator 100 to move in degrees of freedom other than the rotational degree of freedom around the motor/rotors rotation axis.

Note that in order to provide an effective load path between the stator 100 and the upright element 130 (i.e. the lowest forces required to react a given torque), the axis formed through the two rod end bearings 280, 290 must be substantially nonparallel to the axis of the rotor, and located non-coincident to the axis of rotation of the rotor 110. The more perpendicular the tie rod axis can be placed from the motor/ wheel axis, and the further the tie rod axis can be placed from the motor/wheel axis, then the lower the forces that will be borne in the tie rod 140. The use of a tie rod 140 provides a very high-rigidity way of coupling the stator 100 to the upright element 130 without compromising motor torque reaction times.

Although the present embodiment illustrates the coupling device 140 as a tie rod that is coupled to the upright element 130 and the stator 100 respectively via rod end bearings 280, 290 any coupling device 140 that substantially prevents rotation of the stator 100 around the axis of rotation of the rotor 110 while allowing movement of the stator 100 in other degrees of freedom can be used.

Figure 3:
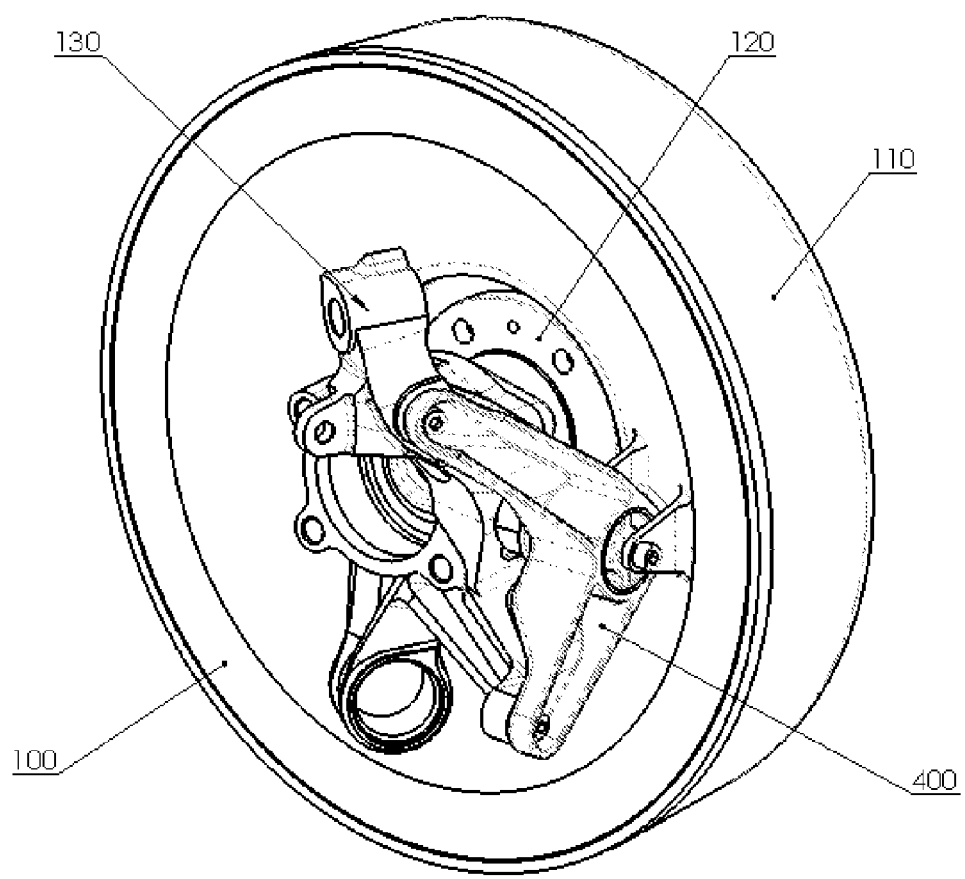
FIG. 3 illustrates an isometric view of an electric motor assembly according to a second embodiment of the present invention.

By way of illustration FIG. 3 illustrates a second embodiment of a coupling device, where for the purposes of this embodiment the coupling device is a compliant bush 400.

A typical design of compliant bush 400 will now be described.

A rigid centre section of a compliant bush 400 is attached rigidly to the stator 100, arranged around this centre section is an outer section which is rigidly attached to the upright element 130. Between the centre and the outer sections is an elastomeric material that may have varying stiffness properties in differing directions. The compliant bush 400 is positioned and shaped to give an effective load path to transmit motor torque between the stator 100 and upright element 130, but also to give a very compliant characteristic in other directions that allows relative motion of the stator 100 with respect to the upright element 130. The compliant bush 400 may be used as a lower cost or higher reliability alternative to the tie rod 140. Although it will impart a small delay to the torque transmission of the motor, this may offer the opportunity to isolate any motor rotational vibrations from transmitting to the vehicle body, for example motor torque ripple.

The invention claimed is:

1. An electric motor or generator system comprising a stator, a rotor, a first bearing, a first coupling device and a second coupling device, wherein the second coupling device includes a first coupling element arranged to be coupled to a vehicle and a second coupling element coupled to the rotor with a second bearing mounted between the first coupling element and the second coupling element to allow the rotor to rotate relative to the vehicle, wherein the first bearing is mounted between a surface of the stator and a surface of the rotor or the second coupling element to allow the rotor to rotate relative to the stator and the first coupling device is arranged to substantially prevent movement of the stator relative to the first coupling element in a first degree of freedom while allowing movement of the stator relative to the first coupling element in at least a second degree of freedom.

2. An electric motor or generator system according to claim 1, wherein the first coupling device is arranged to be coupled to the vehicle.

3. An electric motor or generator system according to claim 1, wherein the first coupling device is coupled to the second coupling device.

4. An electric motor or generator system according to claim 1, wherein the first degree of freedom that the stator is substantially prevented in moving in is the direction of rotation that the rotor is able to rotate in relative to the vehicle.

5. An electric motor or generator system according to claim 1, wherein the first coupling device is a tie rod.

6. An electric motor or generator system according to claim 5, wherein the tie rod is coupled to the stator with a first spherical bearing and is arranged to be coupled to a vehicle with a second spherical bearing.

7. An electric motor or generator system according to claim 6, wherein the second spherical bearing is arranged to be coupled to a suspension upright element on the vehicle.

8. An electric motor or generator system according to claim 6, wherein an axis formed through the first spherical bearing and the second spherical bearing is substantially non-parallel to the axis of the rotor.

9. An electric motor or generator system according to claim 6, wherein an axis formed through the first spherical bearing and the second spherical bearing is located non-coincident of the axis of rotation of the rotor.

10. An electric motor or generator system according to claim 1, wherein the first coupling device is a compliant bush.

11. A vehicle comprising an electric motor or generator system, comprising a stator, a rotor, a first bearing, a first coupling device and a second coupling device, wherein the second coupling device includes a first coupling element arranged to be coupled to a vehicle and a second coupling element coupled to the rotor with a second bearing mounted between the first coupling element and the second coupling element to allow the rotor to rotate relative to the vehicle, wherein the first bearing is mounted between a surface of the stator and a surface of the rotor or the second coupling element to allow the rotor to rotate relative to the stator and the first coupling device is arranged to substantially prevent movement of the stator relative to the first coupling element in a first degree of freedom while allowing movement of the stator relative to the first coupling element in at least a second degree of freedom.

\* \* \* \* \*